United States Patent [19]

Shelton

[11] 4,195,919
[45] Apr. 1, 1980

[54] CONTACT LENS WITH REDUCED SPHERICAL ABERRATION FOR APHAKIC EYES

[76] Inventor: William A. Shelton, 295 Harvard St. #408, Cambridge, Mass. 02139

[21] Appl. No.: 846,829

[22] Filed: Oct. 31, 1977

[51] Int. Cl.$^2$ ............................................... G02C 7/04
[52] U.S. Cl. ................................. 351/160 R; 351/167
[58] Field of Search ............................... 351/160, 167

[56] References Cited

U.S. PATENT DOCUMENTS

| | | | |
|---|---|---|---|
| 3,227,507 | 1/1966 | Feinbloom | 351/160 |
| 3,482,906 | 12/1969 | Volk | 351/160 |

OTHER PUBLICATIONS

Goldberg, J. B., "Eccentricity Values of Corneal Lenses," *Optometric Weekly*, Apr. 1, 1976, pp. 37–39.
Thomas, P. F., "The Prescribing and Fitting of "Conoid" Contact Lenses," *Contacto*, vol. 12, No. 1, Mar. 1968, pp. 66–69.
Feinbloom, W. et al., "Fitting Ellipsoidal Contact Lenses," *Contacto*, vol. 16, No. 1, Mar. 1972, pp. 36–38.

*Primary Examiner*—John K. Corbin
*Assistant Examiner*—Scott J. Sugarman
*Attorney, Agent, or Firm*—Morse, Altman, Oates & Bello

[57] ABSTRACT

Contact lenses, particularly for aphakic eyes, are characterized by a rear conicoid optical surface that is fitted to the cornea and a front prolate ellipsoidal optical surface of particular power, these surfaces having functionally related configurations.

39 Claims, 4 Drawing Figures

CONTACT LENS WITH REDUCED SPHERICAL ABERRATION FOR APHAKIC EYES

BACKGROUND OF THE INVENTION

1. Field of the Invention

The present invention relates to contact lenses and, more particularly, to aspheric contact lenses with conicoid optical surfaces for aphakic eyes. (In the aphakic eye, the crystalline lens has been removed for medical or other reasons leaving the remainder of the eye intact.)

2. Description of the Prior Art

Contact lenses are of particular importance for aphakic persons because they obviate the necessity for heavy spectacles that are unattractive and uncomfortable. Conventional hard and soft plastic contact lenses with spherical optical surfaces suffer from spherical aberration (where peripheral rays come to focus in front of the paraxial image surface). In particular, those lenses in the 12.5 diopter to 15.5 diopter range—generally the correction power range needed for aphakic persons—have short front surface radii (of approximately 5.9 to 7.0 mm), which can lead to severe misfocusing of peripheral rays. Despite the short front surface radii, it is not likely that spherical aberration would be detected in bright surroundings (the pupil diameter stop would be small so that aberrations would be minimal). However, because of such short front surface radii, spherical aberration would be detectable easily at moderately low light levels and could reduce visual acuity dramatically when the wearer is driving at night or is watching television in a darkened room. In the latter case, for example, with a pupil diameter of less than 6 mm, the aphakic eye might see a fuzzy disk of nearly 1.5° diameter surrounding every distant point source of light in the field of view. Assuming the threshold of human visual acuity to be slightly above 0.01°, it is obvious that such an effect is not trivial.

There have been proposals for various contact lens designs characterized by one or more aspheric surfaces. In one case, the contact lens has an ellipsoidal rear surface that is intended to provide an improved fit to the cornea (which normally has an aspheric surface), but, when combined with a short radius front spherical surface, suffers from even greater spherical aberration than conventional lenses. In another case, as exemplified in British Pat. No. 620,852, accepted Mar. 31, 1949, a contact lens for the aphakic eye necessarily would be characterized by at least one non-conicoidal surface (represented by a fourth degree expression, i.e. a Cartesian oval surface of revolution). In still another case, as exemplified in U.S. Pat. No. 3,482,906, issued Dec. 9, 1969, the proposed combination of conicoidal front and rear surfaces are not intended to control spherical aberration, and consequently the combinations of front and rear optical surface eccentricities are different from those of the present invention.

SUMMARY OF THE INVENTION

The primary object of the present invention is to provide, particularly for aphakic eyes, contact lenses in the 10.0 to 18.0 diopter range, which are characterized by improved control of spherical aberration, based upon a novel relationship between a rear conicoidal optical surface that is fitted to the cornea and a prolate ellipsoidal front optical surface of needed power. The relationship between the front and rear surfaces is a polynomial of at least third order, in which the eccentricity $E_1$ (a dimensionless quantity) of the front surface and the eccentricity $E_2$ (a dimensionless quantity) of the rear surface are related as follows:

$$E_1 = [A + B(E_2) + C(E_2)^2 + D(E_2)^3];$$

and in which A, B, C, and D have critical, empirically derived values that will be specified below.

Other objects of the present invention will in part be obvious and will in part appear hereinafter.

The invention accordingly comprises the product, together with its parts and their interrelationships, which are exemplified in the present disclosure, the scope of which will be indicated in the appended claims.

BRIEF DESCRIPTION OF THE DRAWINGS

For a fuller understanding of the nature and objects of the present invention, reference is made to the following detailed description, which is to be taken in connection with the accompanying drawings wherein.

DETAILED DESCRIPTION OF CERTAIN FEATURES OF THE FIGURES

Figure 1:
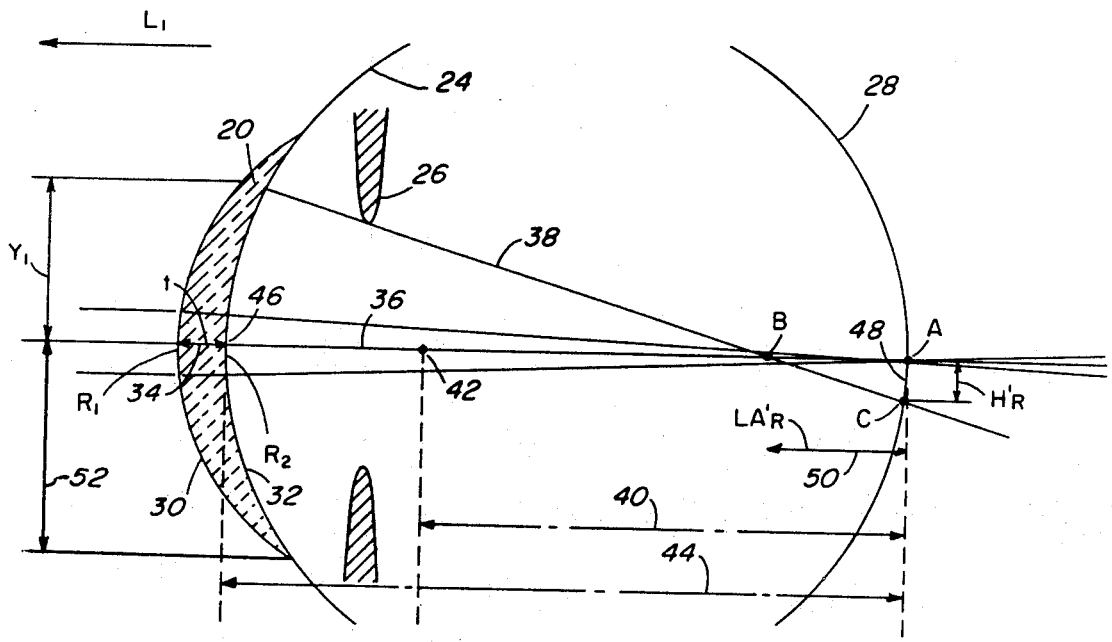
FIG. 1 is a cross-sectional view of a contact lens, in association with depicted portions of an aphakic eye and in relation to incident and refracted rays of light.

Generally, FIG. 1 illustrates a contact lens 20, which is located operatively on the cornea 24 of an aphakic eye. It will be observed that this eye has no crystalline lens, the iris being shown at 26 and the retina, at the paraxial focal surface, being shown at 28. Contact lens 20, which ranges from 10.0 to 18.0 diopters in strength, is characterized by the following:

(1) a front surface 30, of designated vertex radius of curvature $R_1$;

(2) a rear surface 32, of designated vertex radius of curvature $R_2$;

(3) a thickness 34, designated t;

(4) an axial ray at 36;

(5) a peripheral ray at 38;

(6) a point A, at which axial ray 36 intersects paraxial focal surface 28;

(7) a point B, at which peripheral ray 38 intersects axial ray 36;

(8) a point C, at which peripheral ray 38 intersects paraxial focal surface 28;

(9) a paraxial focal length 40, extending from a second nodal point 42 to paraxial focal surface 28;

(10) a paraxial back focal length 44, extending from a point 46 to paraxial focal surface 28;

(11) transverse spherical aberration 48, designated $H'_R$;

(12) a longitudinal spherical aberration 50, designated LA′hd R;

(13) $L_1$ = the standard distance to an object, taken as −6096mm (approximately 20 feet);

(14) $Y_1$ = the height of ray 38 as it strikes front surface 30, taken as 3 mm when determined by iris 26 in a darkened environment;

(15) A semi diameter 52, of the optical surface.

The following description presents mathematical features by which the ellipsoidal configurations of rear and front surfaces 30, 32 can be expressed, presents generic and preferred ellipsoidal configurations that have been found to embody the present invention, and presents specific examples that have been found to produce best results.

Figure 2:
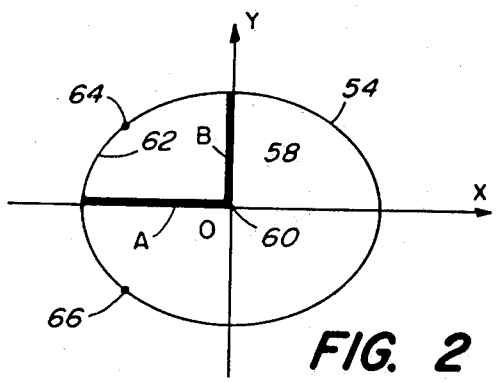
FIG. 2 illustrates geometrical principles, by which the present invention is characterized.

FIG. 2 defines an ellipse 54, as having: a semi-major axis, designated A along an X-axis; a semi-minor axis, designated B along a Y-axis; and an origin 60, designated O. Typically the curve of interest for contact lenses is the short arc 62 that extends from 64 to 66.

The equation of an ellipse is:

$$(X^2/A^2) + (Y^2/B^2) = 1$$

The eccentricity of the ellipse is defined as:

$$e = \sqrt{1 - (B^2/A^2)}$$

The circle is an ellipse of zero eccentricity:

$$e_{circle} = \sqrt{1 - (R^2/R^2)} = 0$$

An ellipse of particular size and shape is defined by a particular set of values of A and B. An ellipsoidal surface is a surface of revolution generated by rotating an ellipse about one of its axes, in this case the X axis.

Figure 3:
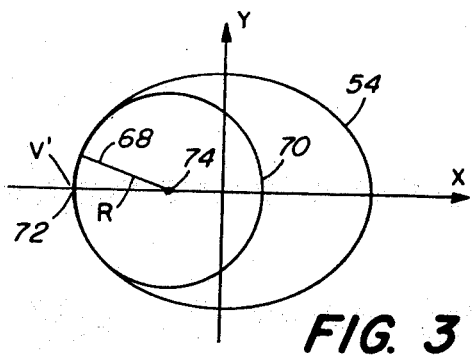
FIG. 3 illustrates further geometrical principles, by which the present invention is characterized.

FIG. 3 alternately defines the ellipse of FIG. 2 in terms of the radius 68, designated R, of an osculating circle 70 and of the eccentricity of the ellipse. Circle 70 is tangent to ellipse 54 at a point 72 on the X-axis, designated V'. The center of circle 70 is at 74 on the X axis. The magnitude of R is equal to the radius of curvature of ellipse 54 at vertex 72.

In reference to FIGS. 2 and 3:

$$A = R/(1 - e^2)$$

$$B = \sqrt{RA} = \sqrt{R^2/(1-e^2)} = R/\sqrt{1-e^2}$$

DETAILED DESCRIPTION OF THE PREFERRED EMBODIMENTS

Case I—Where $E_2 = 0.5200$

It has been found that the optical power of a contact lens, with front and rear prolate ellipsoidal surfaces, can be determined solely by the relationship between $R_1$ and $R_2$, when the vertex thickness and the index of refraction are held constant. The eccentricity of the front surface can be chosen to control the refraction of the peripheral rays after the eccentricity of the rear surface has been chosen for reasonable fit to the user's corneal surface. Specifically, it has been found that a contact lens for an aphakic human eye almost completely eliminates spherical aberration, thereby achieving best results in accordance with the present invention, when it is characterized by the following empirical relationship between $E_1$, the eccentricity of the front or outer ellipsoidal surface, and $E_2$, the eccentricity of the rear or inner ellipsoidal surface.

If $E_2$ is chosen to be 0.5200, then $$E_1 = 3.67695 - 4.82760(N_1') + 2.64699(N_1')^2 - 0.50402(N_1')^3 \quad (1).$$

where $N_1'$ is the index of refraction of the contact lens material, preferably not more than 1.7.

This relationship is valid over the contact lens power range of 10.0 to 18.0 D when $R_2 = 7.0$ mm or greater and the vertex thickness is the normal range for aphakic contact lenses. No power correction adjustment over the 10.0 to 18.0 D power range is needed.

Case II—Where $E_2$ = other than 0.5200 and power = 12.5 to 15.5 D

If $E_2$ is chosen to have a value from 0.0000 to 0.8000, then $$E_1 = A + B(E_2) + C(E_2)^2 + D(E_2)^3 \quad (2),$$

where $A = 4.05867 - 5.08043(N_1') + 2.56577(N_1')^2 - 0.46169(N_1')^3$ $B = -0.16033 + 0.33874(N_1') - 0.22903(N_1')^2 + 0.04887(N_1')^3$ $C = -1.16275 + 0.41548 \ (N_1') + 0.57643 (N_1')^2 - 0.17671(N_1')^3$ $D = -1.26391 + 2.49760(N_1 N_1') - 1.51226 N_1')^2 + 0.26253(N_1')^3$, and $L_1$ = a standard object distance, e.g., approximately −6096 mm, $R_2$ = between 7.0 mm and 8.5 mm, with a preferred value of 7.6 mm, t = a vertex thickness in the normal range of 0.2 to 1.5 mm for aphakic contact lenses, e.g., the median being approximately 0.5 mm, $Y_1$ = approximately 3 mm, Power = 12.5 to 15.5 D, preferably approximately 14 D, Index of refraction of contact lens = less than 1.7.

Case III—Where $E_2$ = other than 0.5200 and power = 10.0 to 18.0 D

When Equation (2) is used and where the needed power is outside the foregoing 12.5 to 15.5 D range, but within the 10.0 to 18.0 D range, the adjusted value of the eccentricity of the front surface of the contact lens, $E_{1(djusted)}$, with an index of refraction of the contact lens, $N_1'$, is as follows:

$$E_{1(adjusted)} = E_{1(calculated)} + \left(\frac{14 - \text{actual power}}{1.5}\right)(\text{power correction factor}) \quad \text{Equation (3)}.$$

where

Power Correction Factor = $F + G(E_2) + H(E_2)^2 + I(E_2)^3$, such that $F = 0.46824 - 0.8810(N_1') + 0.55650(N_2')^2 - 0.11750(N_1')^3$ $G = -2.56767 + 5.15201(N_1') - 3.44146(N_1')^2 + 0.76527(N_1')^3$ $H = 6.72075 - 13.69854(N_1') + 9.27500(N_1')^2 - 2.08333(N_1')^3$ $I = -5.99791 + 12.09027(N_1') - 8.10416(N_1')^2 + 1.80555(N_1')^3$.

Data Basis For equations 1, 3, and 3

The above equations were determined by empirical derivation from the following data, wherein the power correction factors are indicated in parentheses and values without power correction factors need no power correction over the range of 10 D to 18 D, i.e. where the power correction factors are not significant. The following table lists rows of $E_1$ values in reference to columns of $E_2$ values for a series of indices of refraction, $N_1'$. In each case, $t = 0.5$ mm, $L_1 = -6096$ mm, $Y_1 = 3$ mm, $R_2 = 7.6$ mm, $N_1$ (air) = 1, $N_2'$(eye) = 1.336, and power = 14 D.

| Table of $E_1$ values for values of $N_1'$ and $E_2$ | | | | | | |
|---|---|---|---|---|---|---|
| $E_2$ | $N_1' = 1.35$ | $N_1' = 1.40$ | $N_1' = 1.45$ | $N_1' = 1.50$ | $N_1' = 1.55$ | $N_1' = 1.60$ |
| 0 | .74036 | .70805 | .67896 | .65267 | .62880 | .60703 |
|   |        |        | (−.00186) | (−.00235) | (−.00271) | (−.00295) |
| .1 | .74049 | .70864 | .67999 | .65413 | .63067 | .60930 |
|    |        |        | (−.00179) | (−.00226) | (−.00259) | (0.00283) |
| .2 | .74088 | .71040 | .68307 | .65847 | .63624 | .61604 |
|    |        |        | (−.00158) | (−.00198) | (−.00227) | (−.00245) |
| .3 | .74152 | .71329 | .68813 | .66560 | .64535 | .62705 |
|    |        |        |        | (−.00153) | (−.00173) | (−.00185) |
| .4 | .74241 | .71726 | .69506 | .67536 | .65778 | .64202 |
| .5 | .74352 | .72226 | .70375 | .68753 | .67323 | .66055 |
| .52 | .74377 | .72337 | .70568 | .69024 | .67665 | .66464 |
| .55 | .74416 | .72512 | .70870 | .69445 | .68198 | .67010 |
| .6 | .74485 | .72820 | .71403 | .70188 | .69136 | .68220 |
| .65 | .74559 | .73149 | .71972 | .70978 | .70133 | .69406 |
|     |        |        |        |        | (+.00137) | (+.00158) |
| .7 | .74638 | .73498 | .72573 | .71814 | .71182 | .70652 |
|    |        |        |        | (+.00161) | (+.00193) | (+.00220) |
| .75 | .74721 | .73866 | .73206 | .72690 | .72281 | .71995 |
|     |        |        | (+.00163) | (+.00211) | (+.00250) | (+.00281) |

Figure 4:
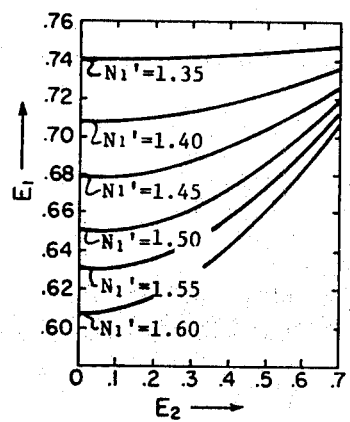
FIG. 4 is a graph containing curves illustrating certain principles in accordance with the present invention.

The polynomials of Equations 1 and 2 consitute approximations corresponding to tables of the above type and to the curves of FIG. 4.

The following non-limiting examples further illustrate the present invention.

EXAMPLE I

The following table of angular errors, for contact lenses of the present invention and for conventional contact lenses, comparatively illustrates the superiority of the former. Where $L_1 = -6096$ mm, $R_2 = 7.6$ mm, $R_1 = 6.43246$ mm, power $= 14$ D, $t = 0.5$ mm, $N_1' = 1.50$, $$\text{Angular error} = \text{TAN}^{-1}\left(\frac{\text{Transverse Spherical Aberration}}{\text{Paraxial Focal Length}}\right)$$

These angular errors cause a fuzzy disk to surround such point source of light in the field of view, the angular diameter of the disk being equal to twice the angular error values below. ($E_1$ value calculated using Equation 1.)

| $Y_1$ | Surfaces of Present Invention $E_2 = .52$ $E_1 = .69021$ | Conventional Spherical Surfaces $E_2 = 0$ $E_1 = 0$ |
|---|---|---|
| −3 mm | −.000055° | −.719175° |
| 2.5 mm | +.000106° | −.397192° |
| 2 mm | +.000109° | −.196123° |
| 1.5 mm | +.000064° | −.080529° |
| 1 mm | +.000022° | −.023416° |
| .001 mm | .000000° | .000000° |

The angular resolution threshold of the eye is about 0.01°. It is apparent that the angular errors produced by surfaces of the present invention are below this threshold, but that angular errors produced by conventional spherical surfaces are above this threshold.

If we calculate $E_1 = 0.7098$, given $E_2 = 0.65$, $r_2 = 7.6$ mm, power = 14D, $N_1' = 1.5$, $Y_1 = 3$ mm, and $t = 0.5$ mm, the resulting angular errors using different values of $R_2$ are as follows:
  $R_2 = 6.5$ mm, an angular error of $-0.0041°$; and
  $R_2 = 8.5$ mm, an angular error of $+0.0018°$.

Using the same $E_1$ value calculated above (for 14D power), the angular errors resulting from the using different values of power are as follows:
  Power = 10D results in an angular error of $-0.0055°$; and
  Power = 18D results in an angular error of $+0.0076°$ The following calculation illustrates the use of Equation 2. Using $N_1' = 1.5$ gives $A = 0.652804$, $B = -0.002601$, $C = 0.161041$, and $D = -0.034056$. Then using $E_2 = 0.65$ gives $E_1 = 0.70980$, which compares favorably with the corresponding value of 0.70978 in the table.

EXAMPLE II

A demonstration of the correspondence between actual and calculated correction values is as follows:

Using Equation 3 with $N_1' = 1.56$, we find $F = -0.002736$, $G = -0.000388$, $H = 0.013480$, and $I = -0.004753$. Next, using $E_2 = 0.7$, we find the power correction factor = 0.00197. Next, using power = 17.5D, we find:

$$\text{Power Adjustment for } E_1 = .00197 \times \left(\frac{14 - 17.5}{1.5}\right)$$

$$= -.00460$$

Next, using Equation 1 we find:

$$E_{1(calculated)} = 0.71080$$

so $$E_{1(adjusted)} = 0.71080 - 0.00460 = 0.70620$$

This value compares favorably with the completely calculated value of $E_1$, which is 0.706163.

Tolerances for Equations 1, 2, and 3

It has been found that if $E_1$ varies as much as $\pm 0.1000$ from the calculated optimum value, the spherical aberration nevertheless is largely reduced in a contact lens when
  Semi-diameter of the optical lens surface is no more than 0.715 times the value of $R_2$,
  $E_2$ = ranges from 0.0000 to 0.8000,
  $N_1'$ = at most 1.6, $R_2$ = at least 7 mm,
and
Optical Power Range 10 to 18 diopters.

Although the numerical constants of Equation 1, 2 and 3 have been given to five decimal places, it is likely that variations from the calculated optimum $E_1$ values smaller than ±0.005 would be undetectable to the user.

The present invention thus provides efficacious contact lenses of reduced spherical aberration for aphakic eyes. Since certain changes may be made in the above disclosure without departing from the invention hereof, it is intended that all matter shown in the accompanying drawing or described in the foregoing specification be interpreted in an illustrative and not in a limiting sense.

What is claimed is:

1. A contact lens for the aphakic eye, said lens having a rear substantially conicoidal surface of eccentricity $E_2$, a front substantially ellipsoidal surface of eccentricity $E_1$, a vertex thickness t, a power D and an index of refraction $N_1'$, where
   $E_2 = 0.5200$,
   $E_1 = 3.67695 - 4.82760(N_1') + 2.64699(N_1')^2 - 0.50402(N_1')^3 \pm 0.1000$,
   $R_2$ = at least 7 mm,
   D ranges from 10.0 to 18.0,
   $N_1'$ = at most 1.6,
   Semidiameter of the optical surface is no more than 0.715 times the value of $R_2$, whereby spherical aberration is controlled.

2. The contact lens of claim 1 wherein t = 0.2 to 1.5 mm.

3. The contact lens of claim 1 wherein said front surface is prolate.

4. The contact lens of claim 1 wherein said rear surface is prolate.

5. The contact lens of claim 1 wherein said rear surface is substantially spherical.

6. The contact lens of claim 1 wherein said rear surface is substantially ellipsoidal.

7. A contact lens having a rear substantially conicoidal surface of eccentricity $E_2$ and radius of curvature $R_2$, a front substantially ellipsoidal surface of eccentricity $E_1$, a vertex thickness t, a power D, and an index of refraction $N'$, where $$E_1 = A + B(E_2) + C(E_2)^2 + D(E_2)^3 \pm 0.1000,$$

such that
   $A = 4.05867 - 5.08043(N_1') + 2.56577(N_1')^2 - 0.46169(N_1')^3$
   $B = -0.16033 + 0.33874(N_1') - 0.22903(N_1')^2 + 0.04887(N_1')^3$
   $C = -1.16275 + 0.41548(N_1') + 0.57643(N_1')^2 - 0.17671(N_1')^3$
   $D = -1.26391 + 2.49760(N_1') - 1.51226(N_1')^2 + 0.26253(N_1')^3$,
and
   $R_2$ = at least 7.0 mm,
   t ranges from 0.2 to 1.5 mm,
   D ranges from 12.5 to 15.5D,
   $N_1'$ = at most 1.6,
   $E_2$ ranges from 0.0000 to 0.8000,
   semi-diameter of the optical surface is no more than 0.715 times the value of $R_2$,
   whereby spherical aberration is controlled.

8. The contact lens of claim 7 wherein $R_2$ = optimally approximately 7.6 mm.

9. The contact lens of claim 7 wherein t = optimally approximately 0.5 mm.

10. The contact lens of claim 7 wherein D = optimally approximately 14.

11. The contact lens of claim 7 wherein said front surface is prolate.

12. The contact lens of claim 7 wherein said rear surface is prolate.

13. The contact lens of claim 7 wherein said rear surface is substantially ellipsoidal.

14. The contact lens having a rear substantially conicoidal surface of eccentricity $E_2$, a front substantially ellipsoidal surface of eccentricity $E_1$ *adjusted*, a power D, a vertex thickness t, and an index of refraction $N_1'$, as follows:

$$E_{1(adjusted)} = E_{1(calculated)} + \left(\frac{14 - \text{actual power}}{1.5}\right) \text{(power correction factor)},$$

where
   $E_1 = A + B(E_2) + C(E_2)^2 + D(E_2)^3 \pm 0.1000$, such that
   $A = 4.05867 - 5.08043(N_1') + 2.56577(N_1')^2 - 0.46169(N_1')^3$
   $B = -0.16033 + 0.33874(N_1') - 0.22903(N_1')^2 + 0.04887(N_1')^3$
   $C = -1.16275 + 0.41548(N_1') + 0.57643(N_1')^2 - 0.17671(N_1')^3$
   $D = -1.26391 + 2.49760(N_1') - 1.51226(N_1')^2 + 0.26253(N_1')^3$,
and where
   Power Correction Factor = $F + G(E_2) + H(E_2)^2 + I(E_2)^3$,
such that
   $F = 0.46824 - 0.88410(N_1') + 0.55650(N_1')^2 - 0.11750(N_1')^3$
   $G = -2.56767 + 5.15201(N_1') - 3.44146(N_1')^2 + 0.6527(N_1')^3$
   $H = 6.72075 - 13.69854(N_1') 9.27500(N_1')^2 - 2.08333(N_1')^3$
   $I = -5.99791 + 12.09027(N_1') - 8.10416(N_1')^2 + 1.80555(N_1')^3$,
and where
   $R_2$ = at least 7.0 mm,
   t ranges from 0.2 to 1.5 mm,
   D ranges from 10.0 to 18.0D,
   $N_1'$ = at most 1.6,
   $E_2$ ranges from 0.0000 to 0.8000,
   semi-diameter of the optical surface is no more than 0.715 times the value of $R_2$,
   whereby spherical aberration is controlled.

15. The contact lens of claim 14 wherein $R_2$ = optimally approximately 7.6 mm.

16. The contact lens of claim 14 wherein t = optimally approximately 0.5 mm.

17. The contact lens of claim 14 wherein D = optimally approximately 14.

18. The contact lens of claim 14 wherein said front surface is prolate.

19. The contact lens of claim 14 wherein said rear surface is prolate.

20. The contact lens of claim 14 wherein said rear surface is substantially ellipsoidal.

21. A contact lens for the aphakic eye, said lens having a rear substantially conicoidal surface of eccentricity $E_2$, a front substantially ellipsoidal surface of eccentricity $E_1$, a vertex thickness t, a power D and an index of refraction $N_1'$, where $E_2 = 0.5200$,
$E_1 = 3.67695 - 4.82760(N_1') + 2.64699(N_1')^2 - 0.50402(N_1')^3$
$R_2$ = at least 7.0 mm,
D ranges from 10.0 to 18.0,
$N_1'$ = at most 1.7, and
semi-diameter of the optical surface is no more than 0.715 times the value of $R_2$, whereby spherical aberration is almost completely eliminated.

22. The contact lens of claim 21 wherein t=0.2 to 1.5 mm.

23. The contact lens of claim 21 wherein said front surface is prolate.

24. The contact lens of claim 21 wherein said rear surface is prolate.

25. The contact lens of claim 21 wherein said rear surface is substantially ellipsoidal.

26. A contact lens having a rear substantially conicoidal surface of eccentricity $E_2$ and radius of curvature $R_2$, a front substantially ellipsoidal surface of eccentricity $E_1$, a vertex thickness t, a power D, and an index of refraction $N_1'$, where $$E_1 = A + B(E_2) + C(E_2)^2 + D(E_2)^3$$

such that
$A = 4.05867 - 5.08043(N_1') + 2.56577(N_1')^2 - 0.46169(N_1')^3$
$B = -0.16033 + 0.33874(N_1') - 0.22903(N_1)^2 + 0.04887(N_1')^3$
$C = -1.16275 + 0.41548(N_1') + 0.57643(N_1')^2 - 0.17671(N_1')^3$
$D = -1.26391 + 2.49760(N_1') - 1.51226(N_1')^2 + 0.26253(N_1')^3$ and
$R_2$ = at least 7.0 mm,
t ranges from 0.2 to 1.5 mm,
D ranges from 12.5 to 15.5D,
$N_1'$ = at most 1.7,
$E_2$ ranges from 0.0000 to 0.8000, and
semi-diameter of the optical surface is no more than 0.715 times the value of $R_2$, whereby spherical aberration is almost completely eliminated.

27. The contact lens of claim 26 wherein $R_2$ = optimally approximately 7.6 mm.

28. The contact lens of claim 26 wherein t = optimally approximately 0.5 mm.

29. The contact lens of claim 26 wherein D = optimally approximately 14.

30. The contact lens of claim 26 wherein said front surface is prolate.

31. The contact lens of claim 26 wherein said rear surface is prolate.

32. The contact lens of claim 26 wherein said rear surface is substantially ellipsoidal.

33. The contact lens having a rear substantially conicoidal surface of eccentricity $E_2$, a front substantially ellipsoidal surface of eccentricity $E_{1(adjusted)}$, a power D, a vertex thickness t and an index of refraction $N_1'$, as follows:

$$E_{1(adjusted)} = E_{1(calculated)} + \left( \frac{14 - \text{actual power}}{1.5} \right) \text{(power correction factor)},$$

where
$E_1 = A + B(E_2) + C(E_2)^2 D(e_2)^3$ such that
$A = 4.05867 - 5.08043(N_1') + 2.56577(N_1')^2 - 0.46169(N_1')^3$
$B = -0.16033 + 0.33874(N_1') - 0.22903(N_1')^2 + 0.04887(N_1')^3$
$C = -1.16275 + 0.41548(N_1') + 0.57643(N_1')^2 - 0.17671(N_1')^3$
$D = -1.26391 + 2.49760(N_1') - 1.51226(N_1')^2 + 0.26253(N_1')^3$.

and where
Power Correction Factor = $F + G(E_2) + H(E_2)^2 \times I(E_2)^3$,
such that
$F = 0.46824 - 0.88410(N_1') + 0.55650(N_1')^2 - 0.11750(N_1')^3$
$G = -2.56767 + 5.15201(N_1') - 3.44146(N_1')^2 + 0.76527(N_1')^3$
$H = 6.72075 - 13.69854(N_1') + 9.27500(N_1')^2 - 2.08333N_1'^3$
$I = -5.99791 + 12.09027(N_1') - 8.10416(N_1')^2 + 1.80555(N_1')^3$.

and where
$R_2$ = at least 7.0 mm,
t ranges from 0.2 to 1.5 mm,
$E_2$ ranges from 0.0000 to 0.8000,
D ranges from 10.0 to 18.0D,
$N_1'$ = at most 1.7, and
semi-diameter of the optical surface is no more than 0.715 times the value of $R_2$, whereby spherical aberration is almost completely eliminated.

34. The contact lens of claim 33 wherein $R_2$ = optimally approximately 7.6 mm.

35. The contact lens of claim 33 wherein t = optimally approximately 0.5 mm.

36. The contact lens of claim 33 wherein D = optimally approximately 14.

37. The contact lens of claim 33 wherein said front surface is prolate.

38. The contact lens of claim 33 wherein said rear surface is prolate.

39. The contact lens of claim 33 wherein said rear surface is substantially ellipsoidal.

* * * * *

UNITED STATES PATENT AND TRADEMARK OFFICE
CERTIFICATE OF CORRECTION

PATENT NO. : 4,195,919
DATED : April 1, 1980
INVENTOR(S) : William A. Shelton

It is certified that error appears in the above-identified patent and that said Letters Patent are hereby corrected as shown below:

Column 2, line 62, delete "hd".

Column 3, line 15, before "B" insert --/--.

Column 3, line 62, before "(1)" insert --Equation--.

Column 4, line 9, before "(2)" insert --Equation--.

Column 4, line 16, after "0.41548" eliminate empty spaces.

Column 4, line 18, after "2.49760(" delete --$N_1$--.

Column 4, line 18, after "1.51226" insert --(--.

Column 4, line 50, "0.8810" should be --0.88410--.

Column 4, line 50, "$(N_2')^2$" should be --$(N_1')^2$--.

Column 5, line 52, before "3mm" delete dash.

Column 8, line 41, "0.6527" should be --0.76527--.

Column 8, line 42, before "9.27500" insert -- + --.

Column 9, line 36, delete "D".

Column 9, line 37, before " = " insert --D--.

UNITED STATES PATENT AND TRADEMARK OFFICE
CERTIFICATE OF CORRECTION

PATENT NO. : 4,195,919
DATED : April 1, 1980
INVENTOR(S) : William A. Shelton

It is certified that error appears in the above-identified patent and that said Letters Patent are hereby corrected as shown below:

Column 10, line 27, "X" should be -- + --.

Column 10, line 35, after first "3" insert --(--.

Signed and Sealed this

Fourth Day of November 1980

[SEAL]

Attest:

SIDNEY A. DIAMOND

Attesting Officer

Commissioner of Patents and Trademarks